United States Patent
Roy et al.

(10) Patent No.: US 10,062,137 B2
(45) Date of Patent: Aug. 28, 2018

(54) COMMUNICATION BETWEEN INTEGRATED GRAPHICS PROCESSING UNITS

(71) Applicant: Hewlett Packard Enterprise Development LP, Houston, TX (US)

(72) Inventors: Indrajit Roy, Palo Alto, CA (US); Sangman Kim, Palo Alto, CA (US); Vanish Talwar, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 15/121,217

(22) PCT Filed: Feb. 27, 2014

(86) PCT No.: PCT/US2014/018886
§ 371 (c)(1),
(2) Date: Aug. 24, 2016

(87) PCT Pub. No.: WO2015/130282
PCT Pub. Date: Sep. 3, 2015

(65) Prior Publication Data
US 2017/0018050 A1    Jan. 19, 2017

(51) Int. Cl.
*G06T 1/20* (2006.01)
*G06F 15/167* (2006.01)
(Continued)

(52) U.S. Cl.
CPC ............ *G06T 1/20* (2013.01); *G06F 9/50* (2013.01); *G06F 12/04* (2013.01);
(Continued)

(58) Field of Classification Search
CPC ...... G06T 1/20; G06T 1/60; G06F 9/50; G06F 12/04; G06F 12/1009; G06F 12/1036; G06F 15/167
See application file for complete search history.

(56) References Cited

U.S. PATENT DOCUMENTS 8,395,631 B1    3/2013  Wilt
2009/0259775 A1  10/2009  Faragher
(Continued)

FOREIGN PATENT DOCUMENTS

JP    4979880 B2    7/2012

OTHER PUBLICATIONS

Aji, A.M. et al., On the Efficacy of GPU-Integrated MPI for Scientific Applications, (Research Paper), Jun. 17-21, 2013, 12 Pgs.
(Continued)

*Primary Examiner* — King Poon
*Assistant Examiner* — Vincent Peren
(74) *Attorney, Agent, or Firm* — Mannava & Kang, P.C.

(57) ABSTRACT

The communication between integrated graphics processing units (GPUs) is disclosed. A first integrated GPU of a first computing device obtains a tuple pertaining to data to be transmitted to a second integrated GPU of a second computing device. The tuple comprises at least a length of the data. The first integrated GPU allocates a virtual address space to the data based on the length of the data, where the virtual address space has a plurality of virtual addresses. Further, a mapping table of a mapping between the plurality of virtual addresses and a plurality of bus addresses is provided by the first integrated GPU to a communication module of the first computing device to transmit the data, where the plurality of bus addresses indicate physical locations of the data.

14 Claims, 5 Drawing Sheets

(51) Int. Cl.
*G06F 9/50* (2006.01)
*G06F 12/04* (2006.01)
*G06F 12/1009* (2016.01)
*G06F 12/1036* (2016.01)
*G06T 1/60* (2006.01)

(52) U.S. Cl.
CPC ...... *G06F 12/1009* (2013.01); *G06F 12/1036* (2013.01); *G06F 15/167* (2013.01); *G06T 1/60* (2013.01); *G06F 2212/656* (2013.01); *G06F 2212/657* (2013.01)

(56) References Cited

U.S. PATENT DOCUMENTS

| | | | |
|---|---|---|---|
| 2012/0169742 A1* | 7/2012 | Baxter | G06T 15/005 345/501 |
| 2012/0221803 A1 | 8/2012 | Stabrawa et al. | |
| 2012/0233396 A1 | 9/2012 | Flynn et al. | |
| 2013/0093779 A1 | 4/2013 | Lyons et al. | |
| 2014/0049551 A1 | 2/2014 | Rao et al. | |
| 2014/0055467 A1* | 2/2014 | Bittner | G06F 3/14 345/520 |
| 2014/0149528 A1* | 5/2014 | VandaVaart | H04L 29/08072 709/213 |
| 2015/0039793 A1* | 2/2015 | Rossetti | H04L 49/90 710/105 |
| 2015/0206277 A1* | 7/2015 | Rao | G06F 9/5016 345/520 |

OTHER PUBLICATIONS

PCT Search Report/Written Opinion—Application No. PCT/US2014/018886 dated Nov. 28, 2014—9 page.

Takizawa, H. et al., clMPI: An OpenCL Extension for Interoperation with the Message Passing Interface, (Research Paper), May 20-24, 2013, 3 Pgs.

Wang, H. et al., GPU-Aware MPI on RDMA-Enabled Clusters: Design, Implementation and Evaluation, Aug. 29, 2013, 4 Pgs.

* cited by examiner

COMMUNICATION BETWEEN INTEGRATED GRAPHICS PROCESSING UNITS

BACKGROUND

Rendering of graphics, in general, is a computation ally intensive task. In order to render graphics on a computing device, a large number of complex mathematical and geometrical computations are to be performed. Generally, a Graphics Processing Unit (GPU), which is a processor optimized for rendering of graphics on computing devices, is used to render the graphics. The GPU supports a parallel processing architecture and thus is able to perform complex computations at high-speeds. Owing to their ability to perform such computations at high-speeds, GPUs are being widely deployed for various other computationally intensive tasks, for example, graph processing, as well.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
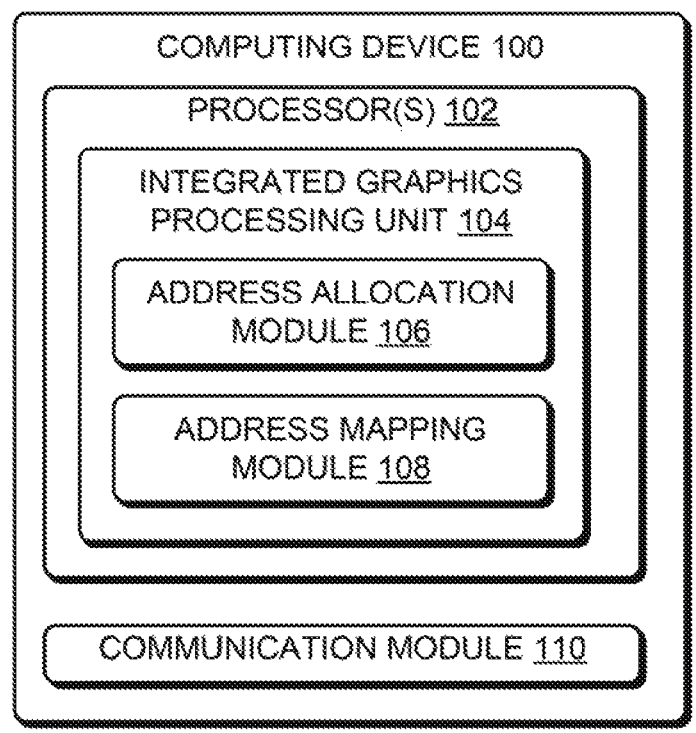
FIG. 1 illustrates components of an example computing device for communication between integrated graphics processing units (GPUs)

Owing to their ability to perform computations at high speeds, GPUs are generally deployed for computationally intensive tasks, such as rendering graphics and graph processing. In one example, GPUs may be deployed in computing devices in a distributed computing environment. In such a computing environment, data is distributed and shared between computing devices present in the computing environment for performing complex computations in reduced time. For instance, the data may be distributed between computing devices, such as servers, mainframes, and laptops. The to received by each of the computing devices may then be processed by a GPU associated with the computing device. Upon processing of the data by the GPU of the computing device, the processed data may then be transmitted by the GPU of the computing device to another GPU of a different computing device for further processing or for collating the processed data.

The GPU may be connected externally to the computing device or may be grates in the computing device. The externally connected GPUs, also known as external GPUs, are cost intensive and less energy efficient. With advancements in technology, GPUs are increasingly being integrated along with central processing units (GPUs) of computing devices. Such GPUs which are integrated in the computing devices are also referred to as integrated GPUs. Generally, integrated GPUs are more energy efficient in comparison with external GPUs. Further, unlike external GPUs, integrated GPUs are cost efficient. As a result, integrated GPUs may be given preference over external GPUs for being deployed in a computing environment.

Generally, in order to transmit data between the integrated OPUS of different computing devices, the data is initially copied to a memory space allocated to a CPU of a computing device intending to transmit the data. For instance, for transmitting the data from a first integrated GPU of a first server to a second integrated GPU of a second server, the data is initially copied from a memory space a located to the first integrated GPU to a memory space allocated to a CPU of the first server. Thereafter, the data is transmitted from the memory space allocated to the CPU of the first server to the second server. The data received from the first server is then initially stored in a memory space allocated to a CPU of the second server. The data is then copied to a memory space allocated to the second integrated GPU of the second server. Thus, transmission of data between integrated GPUs involves multiple copy operations which, in turn, increase computational time and resources, for example, memory and processor time, used for the transmission of data between integrated GPUs. Such an increase in time associated with data transmission may further result in an increased overall computational time spent for performing the task. Further, involvement of CPUs in such data transmissions may slow down or delay other processes handled by the CPU, thereby resulting in degradation of overall performance of the computing devices.

Systems and methods for efficient transmission of data between integrated GPUs are described herein. In an example, a first integrated GPU of a first computing device may provide a mapping table to a communication module of the first computing device for transmission of data, residing in a memory space corresponding to the first integrated GPU, to a second integrated GPU of a second computing device. Thus, multiple copy operations pertaining to data transmission between integrated GPUs are averted. As a result, the overall time associated with data transmission is reduced. Further, as the communication module of the first computing device may retrieve the data directly from the memory space corresponding to the first integrated GPU based on the mapping table, the copying of the data to a memory space allocated to a CPU of the first computing device is averted. Thus, the systems and methods as described herein, result in a reduction of the memory space utilized for transmission of data between integrated GPUs.

In an example implementation, the first integrated GPU may receive a request for transmitting the data to the second integrated GPU of the second computing device. In an example, the request for transmitting the data may be received from the second integrated GPU of the second computing device. For instance, in a case where the first integrated GPU and the second integrated GPU are present in a computing environment, the second integrated GPU may transmit the request to the first integrated GPU for obtaining the data. In said example, an address of a communication module of the second computing device may be identified from the request for providing the data to the second integrated GPU. In another example, an application running on the first computing device may request the first integrated GPU to transmit the data to the second integrated GPU. For instance, upon processing the data, the application may request the first integrated GPU to transmit the data to the second integrated GPU for further processing.

Upon receiving the request, a tuple pertaining to the data may be obtained by tree first integrated GPU from an internal driver, also referred to as a GPU driver. The tuple may include data related information, such as a file descriptor, an offset, and a length of the data. The information included in the tuple indicates a region of the memory space allocated to the first integrated GPU where the data resides. Upon obtaining the tuple, the first integrated GPU may allocate a virtual address space to the data. The virtual address space is a range of virtual addresses utilized for a process. The virtual addresses are used to identify the data at application level. Allocating the virtue address space may facilitate the communication module of the first integrated GPU to obtain the data directly from the memory space corresponding to the first integrated GPU for providing the data to the second integrated GPU. In an example, the virtual address space allocated to the data may be based on the length of the data. In said example, a size of the allocated virtual address space is equal to or greater than the length of the data.

Thereafter, the first integrated GPU may obtain a plurality of bus addresses indicating a physical location of the data from the GPU driver, based on the file descriptor. The bus addresses correspond to a range of physical addresses of the data in the memory space allocated to the first integrated GPU. Each of the physical addresses indicates a particular storage cell of the memory where the data resides. Upon obtaining the bus addresses, the first integrated GPU may create a mapping between the plurality of virtual addresses and the plurality of bus addresses to generate a mapping table. The mapping table may then be provided to the communication module of the first, computing device. The mapping between the plurality of virtual addresses and the plurality of bus addresses facilitates the communication module of the first computing device to obtain the data directly from the memory space corresponding to the first integrated GPU for transmission.

Upon receiving the mapping table, the communication module of the first computing device may determine a location of the data in the memory space allocated to the first integrated GPU based on the mapping in the mapping table. The communication module may then obtain the data directly from the memory space allocated to the first integrated GPU. Subsequently, the communication module of the first computing device may transmit the data to the communication module of the second computing device. The communication module of the second computing device may then provide the data directly to the second integrated GPU. The second integrated GPU thus receives the data directly from the first integrated GPU. As a result, the copying of data in a memory space of a GPU of the second computing device is averted thereby reducing the memory space utilized for transmission of data.

Thus, the methods and systems as described herein facilitate efficient transmission of data between integrated GPUs owing to which multiple copy operations associated with data transmission between integrated GPUs may not need to be performed. As a result, the time associated with transmission of data between integrated GPUs is reduced. Furthermore, the overall computation time of a task involving such data transmissions is reduced. Additionally, as multiple copy operations are averted, the methods and the systems described herein result in a reduction of the memory space utilized for transmission of the data.

The systems and methods are described in greater detail below in conjunction with the following figures. While aspects of described system(s) and method(s) for communication between integrated GPUs can be implemented in any number of different computing systems, environments, and/or configurations, example implementations are described in the context of the following example system(s).

FIG. 1 illustrates various components of an example computing device 100. In an example, the computing device 100 may be implemented as one or more computing systems, such as desktop computers, multiprocessor systems, personal digital assistants (PDA), laptops network computers, cloud servers, minicomputers, mainframe computers, hand-held devices, such as mobile phones, smart phones, and touch phones, and tablets. The computing device 100 may include a processor 102. The processor(s) 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In an example, the processor(s) 102 includes an integrated graphics processing unit (GPU) 104. The integrated GPU 104 can be a GPU integrated in the computing device 100. Further, the integrated GPU 104 and a central processing unit (not shown in the figure) of the computing device 100 share a common memory space. In an example, the integrated GPU 104 includes an address allocation module 106 and an address mapping module 106. The computing device 100 further includes a communication module 110 coupled to the processor 102.

In an example implementation, the computing device 100 may be deployed in a computing environment for performing a computationally intensive task. In said example implementation, the integrated GPU 104 of the computing device 100 may process and transmit data to integrated GPUs (not shown in this figure) of other computing devices (not shown in this figure) present in the computing environment.

In an example, the integrated GPU 104 may provide a mapping table to the communication module 110 for transmission of the data, residing in a memory space corresponding to the integrated GPU 104, directly to another integrated GPU (not shown in figure) of a different computing device (not shown in figure). Further, the communication module 110 transmits the data directly to the other integrated GPU without involvement of the GPU corresponding to the GPUs. Providing the data directly to the communication module 110 averts multiple copy operations involved with transmission of data in integrated GPUs, thereby reducing the processing time and memory space utilized for the task.

The address allocation module 106 may initially allocate virtual address space to the data based on a length of the data. The virtual address space is a set of virtual addresses used to refer to the data at application level. Upon allocation of the virtual address space, the address mapping module 108 may obtain a plurality of bus addresses from a GPU driver, such as an accelerated processing unit (APU) driver, based on a file descriptor of the data. Each of the bus addresses indicates a physical location of the data and corresponds to a physical address. The physical address corresponds to a storage cell where the data resides.

The address mapping module 108 may then generate a mapping table comprising a mapping between the virtual addresses and the bus addresses. The mapping table may facilitate the communication module 110 to obtain the data directly from the memory space corresponding to the integrated GPU 104. In an example, in order to transmit the data, the communication module 110 may initially determine a location of the data residing in the memory space corresponding to the integrated GPU 104 based on the mapping included in the mapping table. The communication module 110 may then obtain the data from the memory space corresponding to the integrated GPU 104 and subsequently transmit the data directly to the other integrated GPU.

Figure 2:
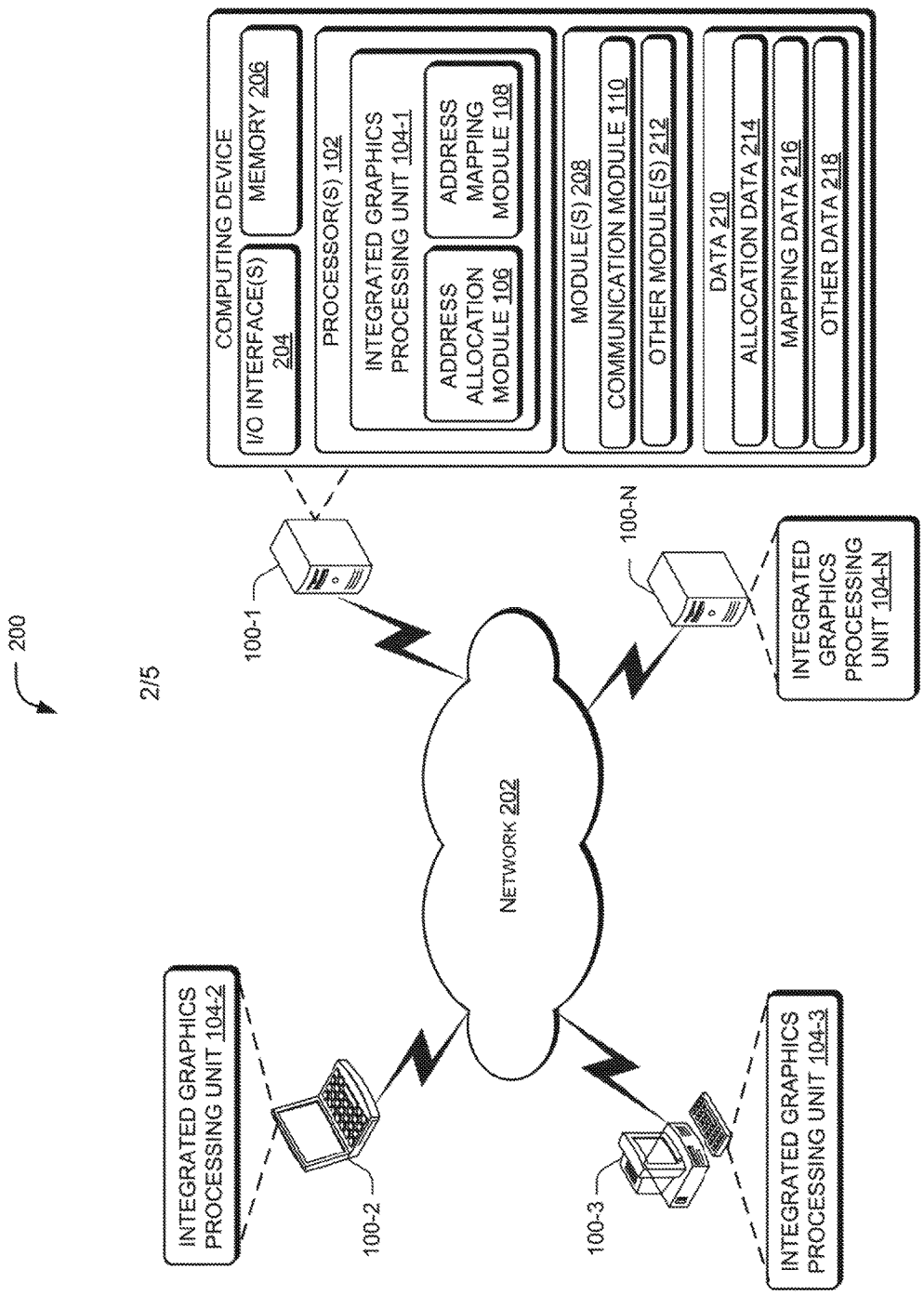
FIG. 2 illustrates an example network environment for communication between integrated graphics processing units (GPUs)

FIG. 2 illustrates an example network environment 200 for communication between integrated GPUs. The network environment 200 includes a plurality of computing devices 100-1, 100-2, 100-3, . . . , 100-N, hereinafter collectively referred to as computing devices 100 and individually referred to as the computing device 100, in communication with each other through a network 202. Communication links between the computing devices 100 are enabled through a desired form of communication, for example, via dial-up modem connections, cable links, digital subscriber lines (DSL), wireless or satellite links, or any other suitable form of communication.

The network 202 may be a wireless network, a wired network, or a combination thereof. The network 202 can also be an individual network or a collection of many such individual networks, interconnected with each other and functioning as a single large network, e.g., the Internet or an intranet. The network 202 can include different types of networks, such as intranet, local area network (LAN), wide area network (WAN), the Internet, Remote Direct Memory Access (RDMA) over Converged Ethernet (RoCE), and Infiniband, among others. The network 202 may either be a dedicated network or a shared network, which represents an association of different types of networks that use a variety of protocols, for example, Hypertext Transfer Protocol (HTTP), Transmission Control Protocol/Internet Protocol (TCP/IP), etc., to communicate with each other. The network 202 may also include individual networks, such as but not limited to, Global System for Communication (GSM) network, Universal Telecommunications System (UMTS) network, and Long Term Evolution (LTE) network. Further, the communication between the computing devices 100 and other entities may take place based on the communication protocol compatible with the network 202.

In an example, each of the computing devices 100 may include an integrated GPU, such as the integrated GPU 104. For example, the computing device 100-1 may include an integrated GPU 104-1, the computing device 100-2 may include an integrated GPU 104-2, the computing device 100-3 may dude an integrated GPU 104-3, and the computing device 100-N may include an integrated GPU 104-N. The integrated GPUs 104-1, 104-2, 104-3, . . . , 104-N, are hereinafter collectively referred to as integrated GPUs 104 and individually referred to as the integrated GPU 104. In an example, the integrated GPUs 104 include the address allocation module 106 and the address mapping module 108.

In an example implementation, the computing device 100 includes I/O interfaces 204. The I/O interface(s) 204 may include a variety of commercially available interfaces, for example, interfaces for peripheral device(s), such as data input output devices, referred to as I/O devices, interface cards, storage devices, and network devices.

Further, the computing device 100 includes memory 206 coupled to the processor 102. The memory 206 may be communicatively coupled to the processor 102 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an example, the memory 206 may include an uncached speculative write-combined (USWC) memory. As generally used herein, "communicatively coupled" may mean a connection between entities to exchange data signals with each other, such as an electrical signal, electromagnetic signal, optical signal and the like.

Further, the computing device 100 includes module(s) 208 and data 210. The modules 208, amongst other things, include routines, programs, objects, components, and data structures, which perform particular tasks or implement particular abstract data types. The modules 208 may also be implemented as, signal processor(s), state machine(s), logic circuitries, and/or any other device or component that manipulate signals based on operational instructions. Further, the modules 208 can be it by hardware, by computer-readable instructions executed by a processing unit, or by a combination thereof. The data 210 serves, amongst other things, as a repository for storing data that may be fetched, processed, received, or generated by the module(s) 208. Although the data 210 is shown internal to the computing devices 100, it may be understood that the data 210 can reside in an external repository (not shown in the figure), which may be coupled to the computing device 100. The computing device 100 may communicate with the external repository through the I/O interface(s) 204 to obtain information from the data 210.

In an example, the module(s) 208 of the computing device 100 includes the communication module 110, and other module(s) 212. The other modules 212 may include programs or coded instructions that supplement applications and functions, for example, programs in an operating system of the computing device 100. In an example implementation, the data 210 of the computing device 100 includes avocation data 214, mapping data 216, and other data 218.

In an example, a first integrated GPU 104, such as the integrated GPU 104-1 of the computing device 100-1 may provide access to the communication module 110 of the computing device 100-1 to data residing in a memory space corresponding to the integrated GPU 104-1 for transmission of the data to a second integrated GPU 104, such as the integrated GPU 104-2, of the computing device 100-2. The communication module 110 of the computing device 100-1 may be hereinafter referred to as a first communication module.

In an example implementation, the address allocation module 106 may receive a request for transmission of the data from a communication module (not shown in figure) of the computing device 100-2. The communication module of the computing device 100-2 may be hereinafter referred to as a second communication module. In said example, the request for transmission of the data may include an address of the second communication module which may be used to transmit the data to the second integrated GPU of the computing device 100-2. In another example implementation, the address allocation module 106 may receive the request for transmission of the data from an application running on the computing device 100-1.

Upon receiving the request, the address allocation module 106 may initially obtain a tuple pertaining to the data from a GPU driver (not shown in the figure), such as an open source Accelerated Processing Unit (APU) driver, of the integrated GPU 104-1. In an example, the tuple may include a file descriptor, an offset, and a length of the data which is to be transmitted. The file descriptor, offset, and length indicates a region in the memory where the data which is to be transmitted resides. For instance, a buffer X pertaining to the memory may be represented by a tuple 7, 0, 0x8000000, where 7 is the file descriptor, 0 is the offset, and 0x800000 depicts 128 Mb length of data. In an example, the address allocation module 106 may store the tuple in the allocation data 214.

Upon obtaining the tuple pertaining to the data, the address allocation module 106 may allocate a virtual address space to the data based on the tuple. The virtual address space is a set of virtual addresses assigned to a process and is used for identifying memory at application level. In an example, the address allocation module 106 may allocate the virtual address space to the data based on the length of the data. For instance, the address allocation module 106 may allocate the virtual address space in a manner such that a number of the virtual addresses in the virtual address space is equal to or greater than the length of the data. For instance, in the previous example of data having length 128 Mb, the address allocation module 106 may allocate a virtual address space ranging from 0x1000000 to 0x9000000. The allocated virtual address space corresponds to a total length of 128 Mb.

The allocated virtual address space may then be mapped to a plurality of bus addresses. Each of the bus address may correspond to a physical address of the data. The physical address indicates a storage cell in the memory space corresponding to the first integrated GPU 104-1 where the data physically resides. In an example implementation, the address mapping module 108 may map the virtual addresses pertaining to the virtual address space to the bus addresses. Initially, the address mapping module 108 may obtain the tuple stored in the allocation data 214. Based on the file descriptor included in the tuple, the address mapping module 108 may obtain the bus addresses from the GPU driver. For instance, the address mapping module 108 may provide the tuple to the GPU driver. The GPU driver may then provide the bus addresses corresponding to the data to the address mapping module 108 based on the file descriptor included in the tuple.

Upon obtaining the bus addresses, the address mapping module 108 may generate a mapping table comprising a mapping between the virtual addresses and the bus addresses. In an example, the address mapping module 108 may perform a one-to-one mapping of the virtual addresses and the bus addresses, such that each virtual address is mapped to an address bus. In an example, address mapping module 108 may store the mapping table in the mapping data 216. The mapping between the virtual addresses and the bus addresses provides direct access to the data thereby averting copying of data to a central processing unit of the computing device 100-1.

In an example, the communication module 110 may have access to the mapping table stored in the mapping data 216. Thus, upon an update of the mapping table, the communication module 110 may transmit the data to the integrated GPU 104-2. In one example, upon updating the table, the communication module 110 may initially identify the virtual addresses in the mapping table. Subsequently, the communication module 110 may determine a location of the data based on the mapping between the virtual addresses and the bus addresses. Thereafter, the communication module 110 may obtain the data directly from the memory space corresponding to the integrated GPU 104-1 based on the mapping. The communication module 110 of the computing device 100-1 may then transmit the data to the second communication module based on the address of the second communication module of the computing device 100-2. In an example, the second communication module, upon receiving the data may provide the data directly to the integrated GPU 104-2 based on a mapping table similar to the mapping table as described above. In said example, an address allocation module (not shown in figure) of the computing device 100-2 may allocate a virtual address space comprising a plurality of virtual addresses to the data. Thereafter, an address mapping module (not shown in figure) of the computing device 100-2 may obtain a plurality of bus addresses from a GPU, driver of the integrated GPU 104-2. In an example, the bus addresses may be used to store the data in a memory space corresponding to the integrated GPU 104-2. The address mapping module may then create the mapping between the virtual addresses and the bus addresses. The second communication module may then store the data directly in the memory space corresponding to the integrated GPU 104-2 based on the mapping.

In another example, the communication module 110 may transmit the data to the integrated GPU 104-2 of the computing device 100-2 upon receiving an indication for transmitting the data from the application. The indication may include the virtual addresses of the data which is to be transmitted. Upon receiving the indication, the communication module 110 may access the mapping table stored in the mapping data 216. The communication module 110 may then obtain the data directly from the memory space corresponding to the integrated GPU 104-1 and subsequently transmit the data directly to the integrated GPU 104-2 of the computing device 100-2 in a manner as described above.

Figure 3:
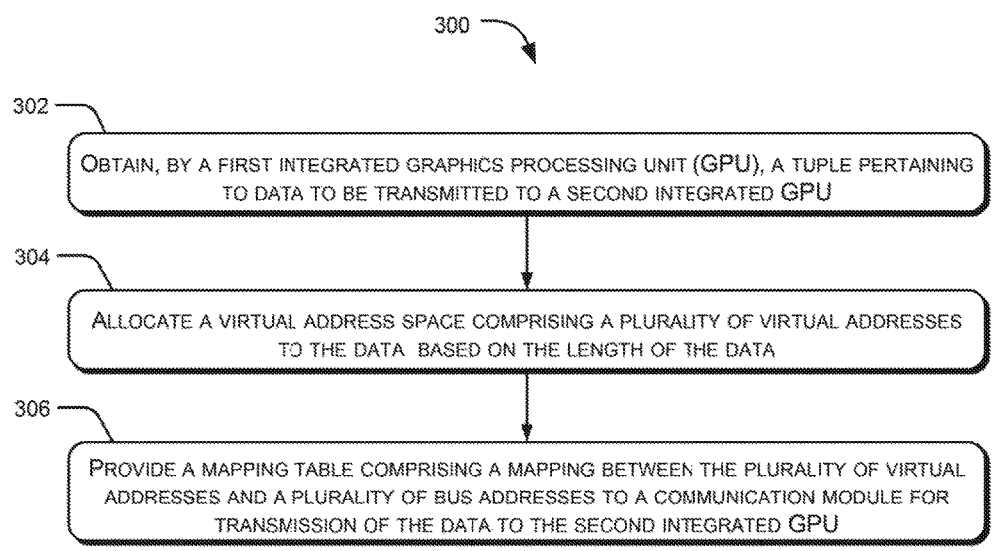
FIG. 3 is a flowchart for communication between integrated graphic processing units (GPUs), according to various examples.
Figure 4:
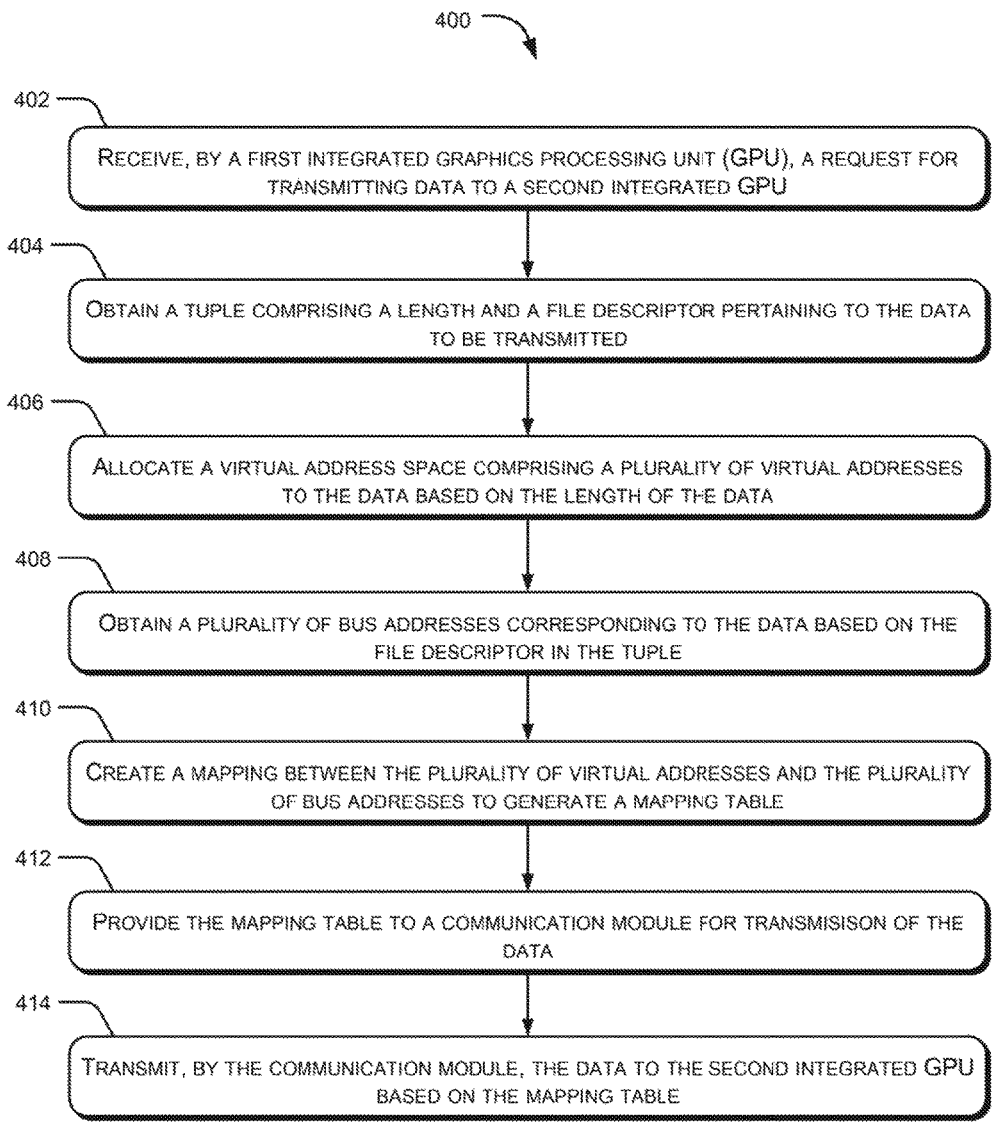
FIG. 4 is a flowchart for communication between integrated graphics processing units (GPUs), according to various examples.

FIG. 3 illustrates an example flowchart 300 for communication between integrated GPUs. FIG. 4 illustrates an example flowchart 400 for communication between integrated GPUs.

The order in which the flowcharts 300 and 400 are described is not intended to be construed as a limitation, and any number of the described flowchart blocks can be combined in any order to implement the flowcharts 300 and 400, or an alternative flowchart. Additionally, individual blocks may be deleted from the flowcharts 300 and 400 without departing from the spirit and scope of the subject matter described herein. Furthermore, the flowcharts 300 and 400 may be implemented in any suitable hardware, machine readable instructions, firmware, or combination thereof.

It is appreciated that the operations in flowcharts 300 and 400 can be performed by programmed computing devices, for example, based on instructions retrieved from non-transitory computer readable media. The computer readable media can include machine-executable or computer-executable instructions to perform a whole or a part of the described operations. The computer readable media may be, for example, digital memories, magnetic storage media, such as a magnetic disks and magnetic tapes, hard drives, or optically readable data storage media, among others.

With reference to flowchart 300 as illusrated in FIG. 3, at block 302, a tuple pertaining to data to be transmitted to a second integrated graphics processing unit (GPU) is obtained by a first integrated GPU. In an example, the first integrated GPU of a first computing device may seek to transmit the data to the second integrated GPU of a second computing device. The data which is to be transmitted resides in a memory space corresponding to the first integrated GPU. In an example, the tuple may be obtained from a GPU driver, for example, an open source application processing unit (APU) driver, of the first integrated GPU. In an example, the tuple may include a file descriptor, an offset, and a length pertaining to the data. In an example, the address a location module 106 may obtain the tuple.

At block 304, a virtual address space is a located to the data based on the length of the data. The virtual address space is a set of virtual addresses used for identifying data at application level. In an example, the address allocation module 106 may allocate the virtual dress space to the data based on the length of the data.

At block 306, a mapping table comprising a mapping between the plurality of virtual addresses and a plurality of bus addresses is provided to a communication module for transmission of the data to the second integrated GPU. The bus addresses indicate a physical location in the memory space corresponding to the first integrated GPU where the data to be transmitted resides. In an example, the bus addresses may be obtained from the GPU driver of the first integrated GPU based on the file descriptor of the data. Thereafter, the virtual addresses may be mapped to the bus addresses for generating the mapping table. The mapping table generated may then be provided to the communication module of the first computing device for transmission of the data to the second integrated GPU of the second computing device. In an example, the address mapping module 108 may provide the mapping table to the communication module 110 for transmission of the data.

With reference to FIG. 4, at block 402, a request for transmitting data to a second integrated GPU is received by a first integrated GPU. In an example, the first integrated GPU of a first computing device may seek to transmit the data to the second integrated GPU of a second computing device based on the request for transmitting the data. In an example, the request for transmitting the data may be received from a communication module of the second computing device. The communication module of the second computing device may be hereinafter referred to as a second communication module. In another example, the request for transmitting the data may be received from an application running on the first computing device. The data to be transmitted resides in a memory space corresponding to the first integrated GPU. In an example, the address allocation module 106 may receive the request for transmission of the data. In an example, the address allocation module 106 of the computing device 100-1 may receive the request for transmitting the data to the integrated GPU 104-2 of the computing device 100-2.

At block 404, a tuple comprising a length and a file descriptor pertaining to the data to be transmitted is obtained. The tuple indicates a region in the memory space corresponding to the first integrated GPU where the data which is to be transmitted resides. In one example, the address allocation module 106 may obtain the tuple from a GPU driver of the first integrated GPU 104.

At block 406, a virtual address space comprising a plurality of virtual addresses is allocated to the data based on the length of the data. The virtual address space is a set of virtual addresses used for identifying data at application level using the virtual addresses. In an example, the address allocation module 106 may allocate the virtual address space to the data residing in the memory space corresponding to the first integrated GPU 104.

At block 408, a plurality of bus addresses corresponding to the data is obtained based on the file descriptor in the tuple. In an example, the bus address may be obtained from the GPU driver of the first integrated GPU based on the file descriptor included in the tuple. In an example implementation, the address mapping module 108 may obtain the bus addresses from the GPU driver of the first integrated GPU 104.

At block 410, a mapping is created between the plurality of virtual addresses and the plurality of bus addresses to generate a mapping table. In an example, each of the virtual addresses is mapped to a bus address from the plurality of bus addresses. In an example, the mapping may be a one-to-one mapping. The mapping between the virtual addresses and the bus addresses facilitates in providing the data residing in the memory space of the first integrated GPU directly for transmission to the second integrated GPU. In an example, the address mapping module 108 may create the mapping between the bus addresses and the virtual addresses to obtain the mapping table.

At block 412, the mapping table is provided to a communication module for transmission of the data. In an example, the address mapping module 108 may provide the mapping table comprising the mapping between the plurality of virtual addresses and the plurality of bus addresses to the communication module of the first computing device. The communication module of the first computing device may be hereinafter referred to as a first communication module.

At block 414, the communication module transmits the data to the second integrated GPU based on the mapping table. In an example, the first communication module may obtain the data based on the mapping included in the mapping table. The first communication module may then transmit the data to the second integrated GPU of the second computing device. In an example, the communication module 110 of the computing device 100-1 may transmit the data to the integrated GPU 104-2 of the computing device 100-2.

In an example, the second communication module may receive the data transmitted by the first communication module. The second communication module may then create a mapping table similar to the mapping table created by the first communication module, as described above. Based on the mapping created by the second communication module, the data can be provided directly to the second integrated GPU by the second communication module.

Figure 5:
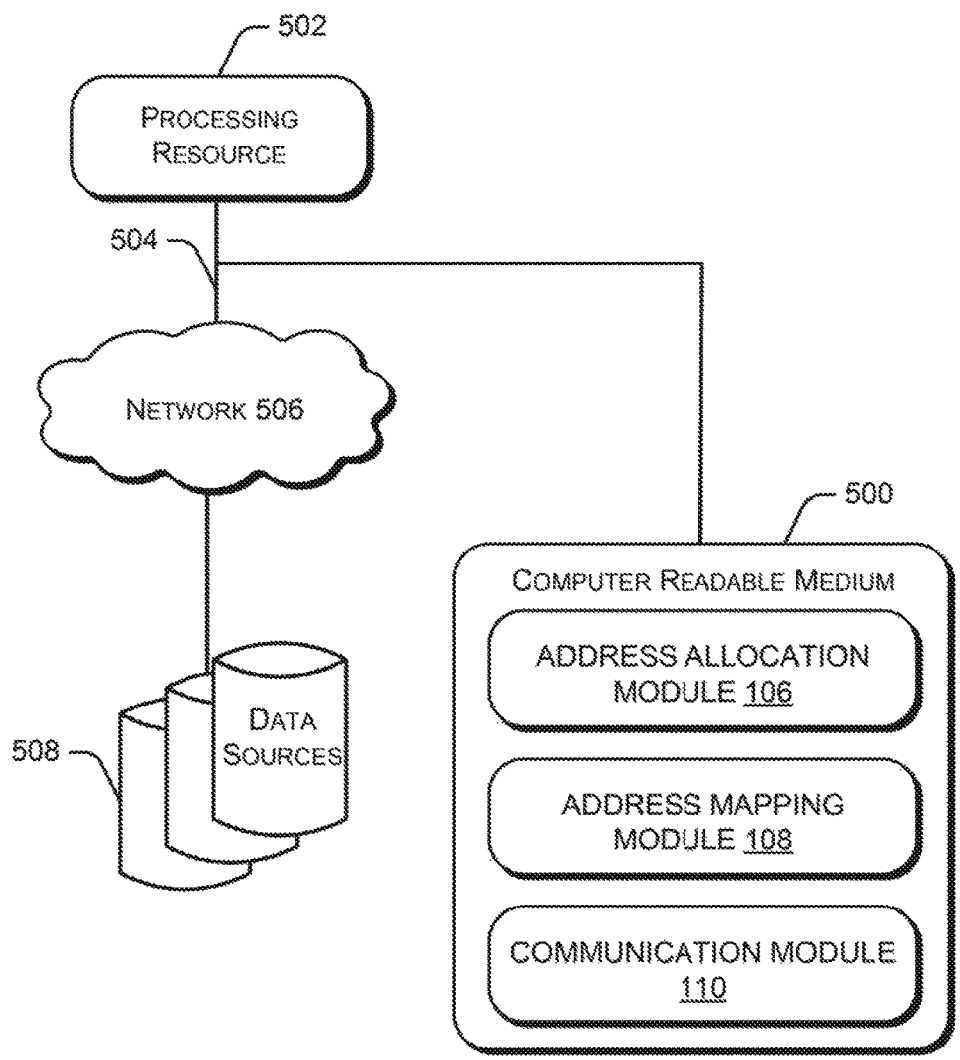
FIG. 5 illustrates an example, computer readable medium storing instructions for communication between integrated graphics processing units (GPUs).

FIG. 5 illustrates an example computer readable medium 500 storing instructions for direct communication between integrated GPUs. In one example, the computer readable medium 500 is communicatively coupled to a processing resource 502 over a communication link 504.

In an example, the processing resource 502 can be a computing device, such as a server, a laptop, a desktop, a mobile device, and the like. In one example, the processing resource 502 may include an integrated graphics processing unit (not shown in figure), such as the integrated GPU 104. The computer readable medium 500 can be, for example, an internal memory device or an external memory device or any commercially available non transitory computer readable medium. In one example implementation, the communication link 504 may be a direct communication link, such as any memory read/write interface. In another example implementation, the communication link 504 may be an indirect communication link, such as a network interface. In such a case, the processing resource 502 can access the computer readable medium 500 through a network 506. The network 506, like the network 202, may be a single network or a combination of multiple networks and may use a variety of different communication protocols.

The processing resource 502 and the computer readable medium 500 may also be communicatively coupled to data sources 508 over the network. The data sources 508 can include, for example, databases and computing devices.

In one implementation, the computer readable medium 500 includes a set of computer readable instructions, such as the address allocation module 106, the address mapping module 108, and the communication module 110. The set of computer readable instructions can be accessed by the processing resource 502 through the communication link 504 and subsequently executed to perform acts for printing of electronic messages.

On execution by the processing resource 502, the address allocation module 106 obtains a tuple pertaining to data to be transmitted. The data to be transmitted resides in a memory space corresponding to an integrated GPU of a computing device, say a first computing device. In an example, the tuple may include a file descriptor, an offset, and a length pertaining to the data. Upon obtaining the tuple, the address allocation module 106 allocates a virtual address space to the data based on the length of the data. The virtual address space includes a plurality of virtual addresses. The address allocation module 106 may then obtain a plurality of bus addresses. A bus address corresponds to a physical address of the data, where the physical address pertains to a memory location in the memory space of the integrated GPU where the data physically resides. The virtual addresses may then be mapped to bus addresses. In an example implementation, the address mapping module 108 may create a mapping between the bus addresses and the virtual addresses to generate a mapping table. The address mapping module 108 may then provide the mapping table to a communication module of the first computing device for transmitting the data to another integrated GPU of a different computing device, say a second computing device. The communication module of the first computing device may obtain the data directly from the memory space of the integrated GPU of the first computing device based on the mapping in the mapping table. Thereafter the communication module of the first computing device may transmit the data to the other integrated GPU of the second computing device.

Although implementations for communication between integrated GPUs have been described in language specific to structural features and/or methods, the appended claims are not necessarily limited to the specific features or methods described. Rather, the specific features and methods are disclosed as examples of systems and methods for communication between integrated GPUs.

What is claimed is:

1. A method for communication between integrated graphics processing units (GPUs), the method comprising:
   obtaining, by a first integrated GPU of a first computing device, a tuple pertaining to data to be transmitted to a second integrated GPU of a second computing device, wherein the tuple comprises at least a length of the data;
   allocating, by the first integrated GPU, a virtual address space to the data based on the length of the data, wherein the virtual address space comprises a plurality of virtual addresses;
   obtaining, by the first integrated GPU, a plurality of bus addresses from a GPU driver of the first integrated GPU based on a file descriptor in the tuple; and
   providing, by the first integrated GPU, a mapping table comprising a mapping between the plurality of virtual addresses and the plurality of bus addresses to a communication module of the first computing device to transmit the data to the second integrated GPU, wherein the plurality of bus addresses indicate physical locations of the data.

2. The method as claimed in claim 1, wherein the method further comprises:
   determining, by the communication module of the first computing device, a location of the data in a memory space corresponding to the first integrated GPU based on the mapping between the plurality of virtual addresses and the plurality of bus addresses; and
   obtaining, by the communication module of the first computing device, the data from the memory space corresponding to the first integrated GPU based on the determining.

3. The method as claimed in claim 2, wherein the method further comprises transmitting, by the communication module, the data to a communication module of the second computing device.

4. The method as claimed in claim 3, wherein the method further comprises:
   receiving, by the communication module of the second computing device, the data from the communication module of the first computing device; and
   storing, by the communication module of the second computing device, the data in a memory space corresponding to the second integrated GPU.

5. The method as claimed in claim 1, wherein the method further comprises receiving, by the first integrated GPU, a request for transmitting the data from at least one of the second integrated GPU and an application running on the first computing device.

6. The method as claimed in claim 1, wherein a size of the allocated virtual address space is at least equal to the length of the data.

7. The method as claimed in claim 1, wherein the data resides in a memory space corresponding to the first integrated GPU.

8. A computing device comprising:
   a processor comprising an integrated graphical processing unit (GPU), the integrated GPU comprising;
   an address allocation module to allocate a virtual address space to data to be transmitted to another integrated GPU based on a length of the data, wherein the virtual address space comprises a plurality of virtual addresses; and
   an address mapping module to,
   obtain a plurality of bus addresses indicating physical locations of the data from a GPU driver based on a file descriptor of the data; and
   generate a mapping table comprising a mapping between the plurality of virtual addresses and the plurality of bus addresses; and
   a communication module coupled to the processor to obtain the data from the memory space corresponding to the integrated GPU based on the mapping table to transmit the data to the other integrated GPU.

9. The computing device as claimed in claim 8, wherein the communication module further determines a location of the data residing in a memory space corresponding to the integrated GPU based on the mapping between the plurality of virtual addresses and the plurality of bus addresses.

10. The computing device as claimed in claim 8, wherein the communication module further transmits the data to the other integrated GPU.

11. The computing device as claimed in claim 8, wherein the address mapping module further provides the mapping table to the communication module to transmit the data to the other integrated GPU.

12. The computing device as claimed in claim 8, wherein the address allocation module further obtains a tuple comprising at least the length of the data and the file descriptor of the data form the GPU driver.

13. A non-transitory computer-readable medium comprising computer readable instructions that, when executed, cause a computing device comprising an integrated GPU to:
    allocate a virtual address space to data to be transmitted to an another integrated GPU based on a length of the data, wherein the virtual address space comprises a plurality of virtual addresses;
    obtain a plurality of bus addresses indicating physical locations of the data from a GPU driver based on a file descriptor of the data; and
    provide a mapping table comprising a mapping between the plurality of virtual addresses and the plurality of bus addresses to a communication module of the computing device to transmit the data to the other integrated GPU.

14. The non-transitory computer-readable medium as claimed in claim 13 further comprising computer readable instructions that, when executed, cause the communication module of the computing device to, determine a location of the data residing in a memory space corresponding to the integrated GPU based on the mapping between the plurality of virtual addresses and the plurality of bus addresses;
    obtain the data from the memory space corresponding to the integrated GPU based on the determining; and
    transmit the data to the another integrated GPU.

\* \* \* \* \*